United States Patent [19]
Hamagishi et al.

[11] Patent Number: 5,493,351
[45] Date of Patent: Feb. 20, 1996

[54] LIQUID CRYSTAL PROJECTOR

[75] Inventors: Goro Hamagishi; Masahiro Sakata, both of Osaka; Katsumi Terada, Kyoto; Haruhisa Kosaka, Nara; Shunichi Kishimoto; Keiichi Kanatani, both of Osaka, all of Japan

[73] Assignee: Sanyo Electric Co., Ltd., Osaka, Japan

[21] Appl. No.: 160,024

[22] Filed: Nov. 30, 1993

[30] Foreign Application Priority Data

Nov. 30, 1992 [JP] Japan ..................... 4-345631

[51] Int. Cl.$^6$ ................................ G03B 21/00
[52] U.S. Cl. .................... 353/84; 353/52; 359/40
[58] Field of Search .................. 353/20, 30, 31, 353/38, 84, 102, 54, 55, 52; 359/40, 64, 63

[56] References Cited

U.S. PATENT DOCUMENTS

| | | | |
|---|---|---|---|
| 4,294,524 | 10/1981 | Stolov | 353/84 |
| 4,864,390 | 9/1989 | McKechnie et al. | 353/34 |
| 4,875,064 | 10/1989 | Umeda et al. | 353/78 |
| 4,971,436 | 11/1990 | Aoki et al. | 353/122 |
| 5,005,950 | 4/1991 | Morin. | |
| 5,032,021 | 7/1991 | Kanatani et al. | 353/54 |
| 5,037,196 | 8/1991 | Takafuji et al. | 353/84 |
| 5,159,478 | 10/1992 | Akiyama et al. | 359/64 |
| 5,229,874 | 7/1993 | Lehureau et al. | 359/64 |
| 5,251,071 | 10/1993 | Kusukawa et al. | 359/891 |
| 5,299,041 | 3/1994 | Morin et al. | 359/59 |

FOREIGN PATENT DOCUMENTS

| | | |
|---|---|---|
| 019023 | 8/1986 | European Pat. Off. . |
| 0287034 | 10/1988 | European Pat. Off. . |

*Primary Examiner*—Thomas B. Will
*Assistant Examiner*—William C. Dowling
*Attorney, Agent, or Firm*—Spensley Horn Jubas & Lubitz

[57] ABSTRACT

A liquid crystal projector includes a light source, a color filter for adding color projection image, a liquid crystal panel for forming a projection image on it, a projection lens and an optical unit located between the color filter and the liquid crystal panel for optically coupling the color filter and the liquid crystal panel. The color filter is separately located from the liquid crystal, and therefore the increase in temperature on the color filter because of absorbing the light from the light source has less effect on the liquid crystal panel.

9 Claims, 12 Drawing Sheets

LIQUID CRYSTAL PROJECTOR

FIELD OF THE INVENTION

The present invention relates to a liquid crystal projector. More specifically, the present invention relates to a color liquid crystal projector, having only one liquid crystal panel, in which heat effect from a light source to the liquid crystal panel is reduced.

BACKGROUND OF THE INVENTION

In a conventional liquid crystal projector, as shown in FIG. 16, light emitted by a light source 101 is reflected by a reflector 102 and converted to nearly parallel rays. The light passes through a ultraviolet and infrared cutoff filter 103 to eliminate undesired wavelengths, and passes through a condenser lens 104 to be slightly condensed, and enters into a color liquid crystal panel 105.

The color liquid crystal panel 105 has a structure as shown in FIG. 17. The panel 105 includes Thin Film Transistors (TFTs) and bus lines 106, transparency pixel electrodes 107, liquid crystal layer 108, black-matrix 109 and color filter 110 between glass plates 111 and 112. The black-matrix 109 prevents undesired light from going into the TFTs. The color filter 110 is for adding color to light entering into the liquid crystal layer 108 (or to light emitted form the liquid crystal layer 108).

Referring again to FIG. 16, a polarizing plate 113 is positioned on the incident side (the side nearest to the light source 101) of the color liquid crystal panel 105. The polarizing plate 113 may be attached to the condenser lens 104, as shown in FIG. 16. Another polarizing plate 114 placed on the emanating side (a side near to the projection lens 116) of the color liquid crystal panel 105 is attached directly to the liquid crystal panel 105. To cool the color liquid crystal panel 105 and polarizing plate 114 on the emanating side of the liquid crystal panel 105, a liquid cooler 115 is attached to the polarizing plate 114 on the emanating side of the liquid crystal panel 105. The liquid cooler 115 includes a heat sink 115a and a container 115b in which coolant 115c is included. An image formed on the liquid crystal panel 105 is projected on the screen (not shown) by a projector lens system 116.

In this conventional single plate liquid crystal projector, the increase in temperature in some parts caused by the absorbed light is higher than that of another type of projector having three liquid crystal panels corresponding to three different colors. This is because all the light energy irradiated from the light source 101 is applied to a single color liquid crystal panel 105. For example, when a combination of light source including a 150 watt metal halide lamp and a 3 inch color liquid panel is used, it is observed that the temperature of the polarizing plate on the incident side of the liquid crystal panel 105 is 70° C. higher than that of the ambient air about the liquid crystal projector. Similarly, liquid cooler 115 is 30° C. higher than that of the ambient air, because the black-matrix 109 of the liquid crystal panel 105, the color filter 110 and the polarizing plate 114 located on the emanating side of the liquid crystal panel 105 absorb light.

This increase in temperature of the device causes a high rate of degradation of physical and electrical characteristics of the liquid crystal layer 108, the polarizing plates 113, 114 and the color filter 110. To solve this problem, the quantity of light that enters into the liquid crystal layer 114 may be limited. But in such a case, the image that is projected by the projector is darkened and therefore, the quality of the projected image may be poor.

Further, in such a conventional liquid crystal projector, since the color liquid crystal panel 105 has a structure in which the liquid crystal layer 108 and the color filter 110 are combined as a unit, a defective liquid crystal layer 108 (resulting from a manufacturing process defect, for example) makes the whole color liquid crystal panel 105 useless even if the color filter 110 is in good condition, and vice versa. Therefore, the manufacturing cost of the liquid crystal panel 105 in which the liquid crystal layer 108 and the color filter 110 are combined as a unit is higher than that of a liquid crystal panel in which the liquid crystal layer and the color filter are not combined. Accordingly, in view of the relatively high rejection rate in the manufacturing process and the resulting high manufacturing cost, it is not desirable to use the structure of the liquid crystal panel 105 as shown in FIG. 17.

SUMMARY OF THE INVENTION

An object of the present invention is to provide a liquid crystal projector having a liquid crystal panel wherein adverse thermal effects to the liquid crystal panel are substantially reduced.

Another object of the present invention is to provide a liquid crystal projector having a liquid crystal panel wherein the durability of the liquid crystal panel is substantially improved.

Another object of the present invention is to provide a liquid crystal projector wherein the rejection rate in the manufacturing process of the liquid crystal projector is substantially reduced.

In accordance with these and other objects, the present invention comprises a liquid crystal projector for forming images including a light source device, a projector lens system, a liquid crystal panel located in the optical path between the light source and the projector lens system, and a color filter that gives the images color components. In one aspect of a preferred embodiment of the present invention, the liquid crystal panel and the color filter are separated from each other.

Although the temperature of the color filter may rise due to the absorption of the light irradiated from the light source, the liquid crystal panel is less affected by the heat of the color filter, since the liquid crystal panel and the color filter are separated from each other. As a result, deterioration of the liquid crystal panel is effectively reduced.

DETAILED DESCRIPTION OF THE PREFERRED EMBODIMENTS

A liquid crystal projector embodying the present invention is described below in detail with reference to the drawings.

Figure 1:
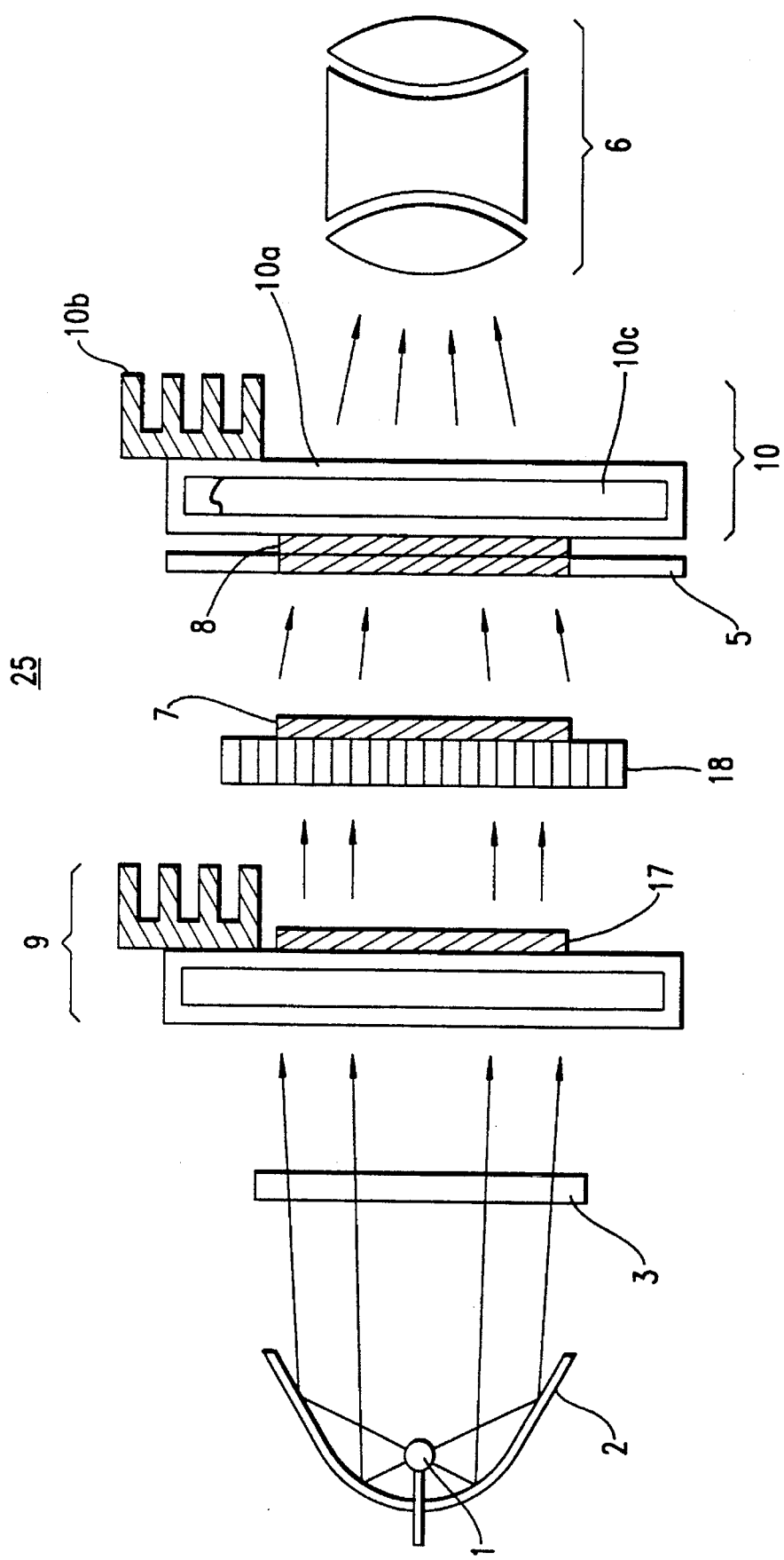
FIG. 1 is a sectional view showing the arrangement of the optical components in a first embodiment of the present invention.

In one embodiment of the present invention, a liquid crystal. projector 25 has a light source 1 for emitting light. The emitted light is reflected and converted to substantially parallel rays by a reflector 2. The light from the reflector 2 passes through an infrared and ultraviolet cutoff filter 3 to eliminate undesired wavelengths of light. The light from the cutoff filter 3 enters into a color filter 17 to add the predetermined color components to the light passing through the filter. As best seen in FIG. 1, a liquid cooler 9 is attached to the color filter 17. The light including the color components provided by the color filter 17 is focused at a liquid crystal panel 5 by an optical unit 18. The light having the color components passes through an image formed at the liquid crystal panel 5. The light is modulated in transmittance by the liquid crystal panel 5 and is projected by a projector lens 6 onto a screen (not shown).

A polarizing plate 7 disposed on the incident side of the liquid crystal panel 5 is attached to the optical unit 18. A polarizing plate 8 disposed on the emanating side of the liquid crystal panel 5 is attached to the liquid crystal panel 5. Additionally, another liquid cooler 10 is attached to the polarizing plate 8 for cooling the liquid crystal panel 5 and the polarizing plate 8.

As described above, the liquid crystal panel 5 and the color filter 17 are separately disposed. Both the color filter and the polarizing plate 8 have a liquid cooler 9, 10 and therefore a high cooling effect is achieved.

Figure 2:
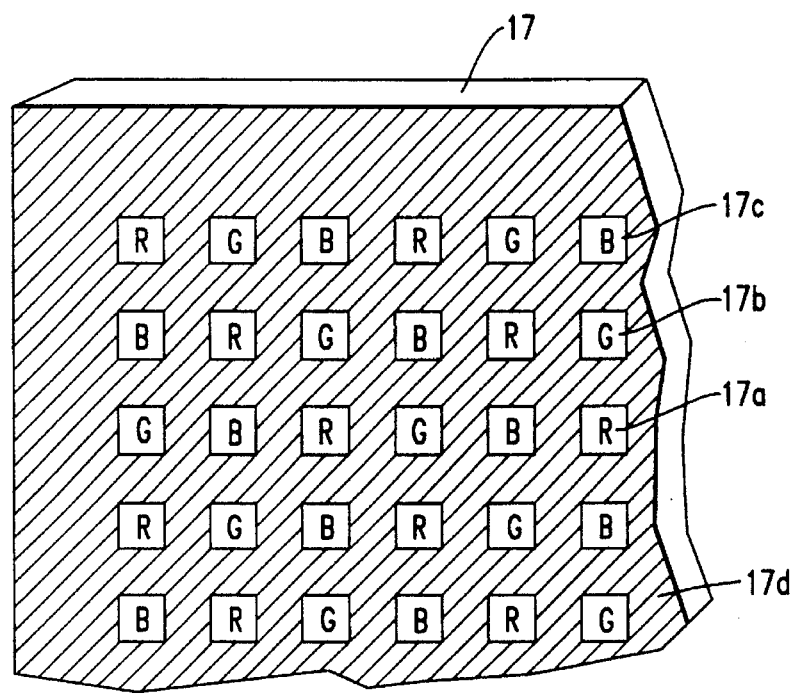
FIG. 2 is a front view of a color filter used in the present invention.

As best shown in FIG. 2, the color filter 17 comprises a matrix of predetermined color filters 17a, 17b and 17c of R, G and B, respectively which represent three components of light (red, green and blue). The locations of the filters 17a, 17b and 17c correspond to locations of picture elements on the liquid crystal panel 5. Filters 17a, 17b and 17c are separated from each other by black matrix 17d which is made of a material having high reflection factor, such as for example, an aluminum. As a result, the light from the light source 1 is reflected back by the black matrix 17d in the direction of the light source 1 and the reflector 2. The light reflected by the black matrix 17d is reflected by the reflector 2 again, so the light is efficiently used.

In one embodiment, each of the filters 17a, 17b and 17c may be formed by a pigment color filter. In another preferred embodiment, a multi-layered interference filter may be used. It should be appreciated that the multi-layered interference filter has improved heat resisting characteristics. When a multi-layered interference filter is used, each filter 17a, 17b, 17c reflects the light components which are not selected. As a result, the efficiency in using the light is further improved.

Furthermore, when the multi-layered interference filter is used, the liquid cooler 9 may be omitted, because of the heat-resisting characteristics of the interference filter. But, if the filters are formed by pigments or dyes, it is preferable to use the liquid cooler with the color filter 17 to cool the color filter 17.

Figure 3:
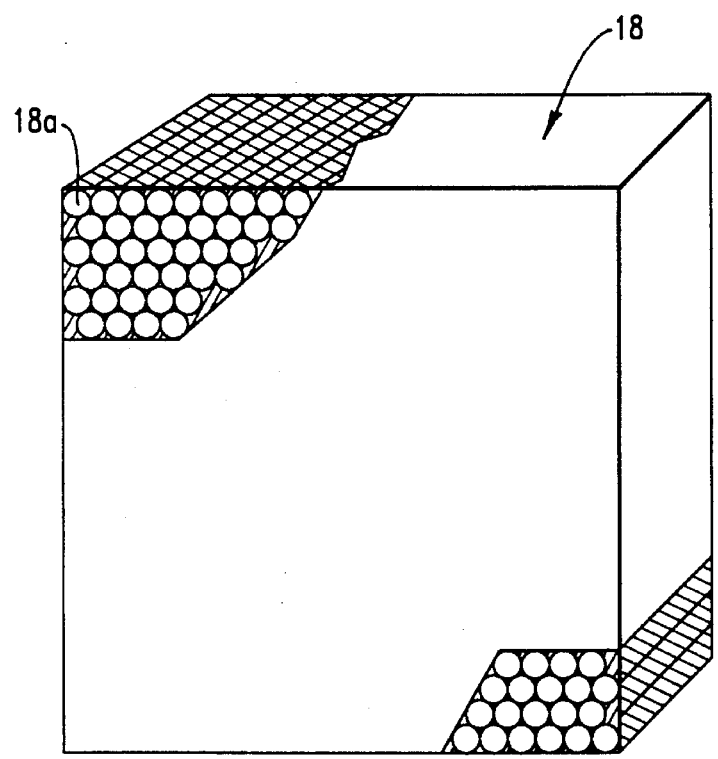
FIG. 3 is a perspective view of an optical unit used in the present invention.
Figure 4:
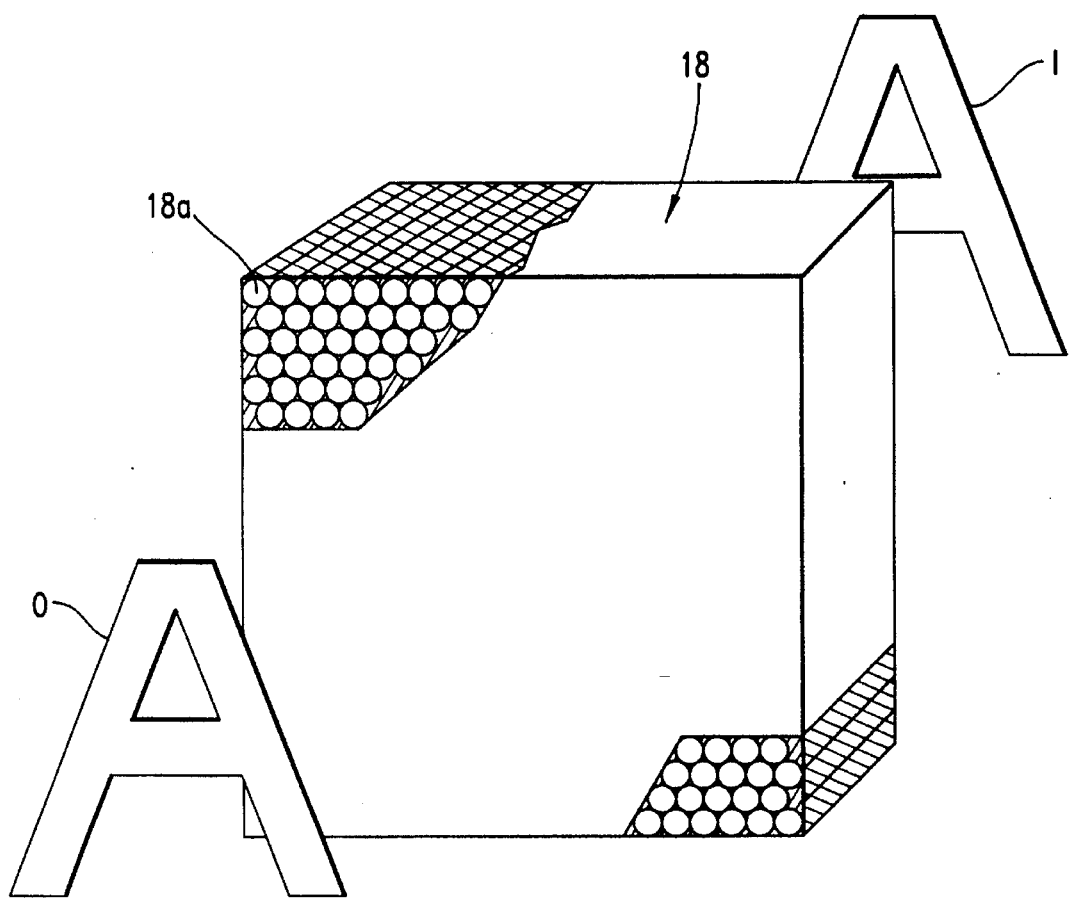
FIG. 4 is an explanatory view showing the function of a graded index lens used in the present invention.

The optical unit 18 is formed by an array of graded index lens 18a arranged in the form of a matrix, as shown in FIG. 3. In the optical unit 18, the graded index lenses 18a are arranged to form a same orientation and same size image of an object. As a result, as shown in FIG. 4, the optical unit 18 forms an same orientation and same size image I of an object O located in front of the optical unit 18.

As described above, the filters 17a, 17b and 17c are arranged in a matrix which corresponds to the arrangement of the picture elements of the liquid crystal panel 5. The optical unit 18 forms a same orientation and same size image of the color filter 17 on the liquid crystal panel 5, as shown in FIG. 4. As a result, the light passed through each of the filters 17a, 17b and 17c, which are separated by the black-matrix of the color filter 17 as shown in FIG. 2, enters an aperture of the associated picture element of the liquid crystal panel 5. Each picture element is separated by the black-matrix of the liquid crystal panel. Further, the light passed through each of the filters 17a, 17b and 17c does not hit the black matrix of the liquid crystal panel 5. Accordingly, the loss of light due to reflection at the black matrix of the liquid crystal panel 5 is substantially eliminated.

Alternatively, such an arrangement of the filters and picture elements of the liquid crystal panel may eliminate the necessity of the black matrix of the liquid crystal panel 5. As a result, since it is not necessary to produce the black-matrix of the liquid crystal panel in the manufacturing process, the cost of manufacturing the liquid crystal panel 5 is reduced.

In the above color filter 17, the major portion of the non-required light is reflected and is not absorbed by the black matrix 17d, resulting in a low temperature increase in the color filter 17. Accordingly, the above structure, as shown in FIG. 1, substantially reduces adverse thermal effects by the color filter 17 on the polarizing plate 7 (positioned on the incident side of the liquid crystal panel 5) and on the liquid crystal panel 5.

Furthermore, in addition to the lowered temperature in the color filter 17, the color filter 17 is separated from the liquid crystal panel 5. As a result, heat radiation from the color filter 17 to the liquid crystal panel 5 is substantially reduced. Further, there is only a small temperature increase of the liquid crystal panel 5 due to the heat radiation from the color filter 17 and the polarizing plate 7, which is disposed on the incident side.

Further, as described above, the redundant light does not reach the black matrix of the liquid crystal panel 5. Therefore, the liquid crystal panel 5 is substantially prevented from a temperature increase due to absorbing the redundant light. As a result, the rate of degradation of the liquid crystal panel 5 in using the liquid crystal projector is reduced.

As the redundant light is not absorbed by the black matrix 17d of the color filter 17, but mostly reflected by the black matrix 17d, the redundant light does not reach the polarizing plate 7 on the incident side of the liquid crystal panel 5. As the result, the increase in temperature at the polarizing plate 7 on the incident side of the liquid crystal panel 5 is much reduced and the life of the polarizing plate 7 is elongated.

FIG. 5 shows one embodiment of a graded index lens system 40 including a graded index lens 50. In one embodiment, the graded index lens 50 has a conjugate length 52 of 14.4 mm, an actual length 54 of 6.6 mm, and a work length 56 of 3.9 mm. In the illustrated embodiment, the graded index lens 50 has a diameter 58 of 9.3 mm. The graded index lens 50 has an incident end face 60 and an emission end face 62. The light path may be adjusted so that the light enters the graded index lens 50 through the incident end face 60 at a predetermined angle, such as for example, 4° with respect to a central optical axis 64 of the graded index lens 50. However, as shown in FIGS. 5(a) to 5(e), the light enters the graded index lens 50 at different points, each defined by three dimensional rectangular coordinates (x, y, z) along the incident end face 60. In the illustrated embodiment, it should be noted that the center of the incident end face 60 of the graded index lens 50 is defined by coordinates (x, y, z)=(3.9, 0, 0), and the center of the emission end face 62 of the graded index lens 50 is defined by coordinates (x, y, z)=(10.5, 0, 0).

Figure 5A:
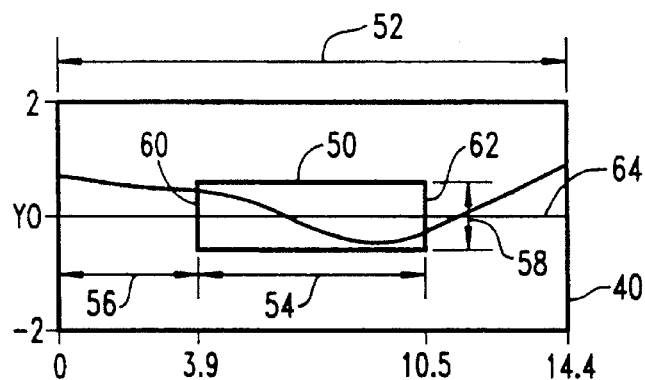
FIG. 5(a) to 5(e) are explanatory views showing various light paths obtained by the graded index lens of FIG. 4.
Figure 5B:
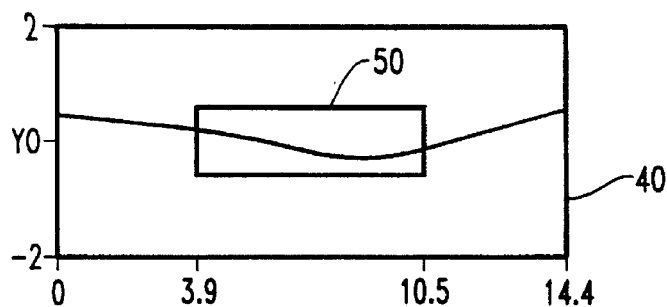
Figure 5C:
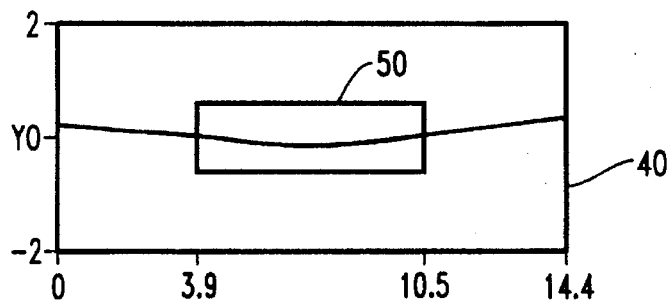
Figure 5D:
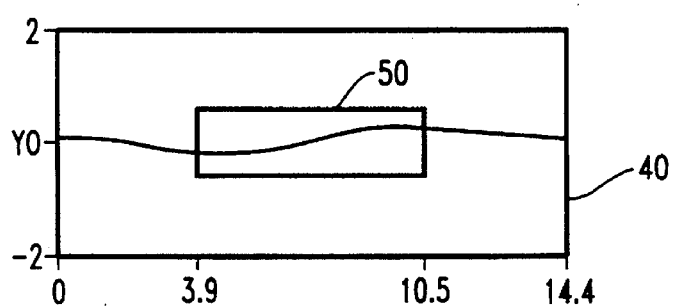
Figure 5E:
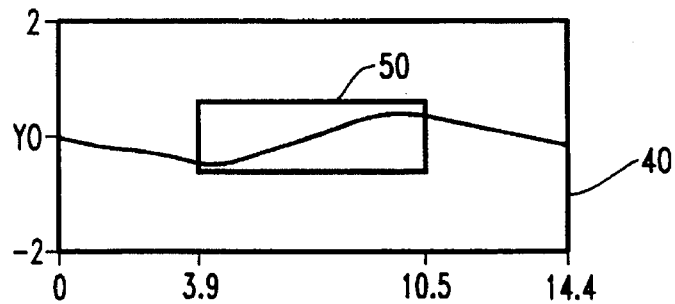

In FIG. 5(a), the light enters the graded index lens 50 in the incident end face 60 at an entering point (3.9, 0.4, 0), and is upwardly emitted at an emitting point (10.5, −0.29, 0) in the emission end face 62 at an emitting angle of 13.9° with respect to the central optical axis 64 of the graded index lens 50.

In FIG. 5 (b), the entering point is (3.9, 0.2, 0) and the emitting point is (10.5, −0.12, 0) and the emitting angle is 8.7°. In FIG. 5 (c), the entering point is (3.9, 0, 0) and the emitting point is (10.5, 0.04, 0) and the emitting angle is 3.3°. In FIG. 5 (d), the entering point is (3.9, −0.2, 0) and the emitting point is (10.5, 0.21, 0) and the emitting angle is −1.9°. In FIG. 5 (e), the entering point is (3.9, −0.4, 0) and the emitting point is (10.5, 0.38, 0) and the emitting angle is −6.9°.

Figure 6:
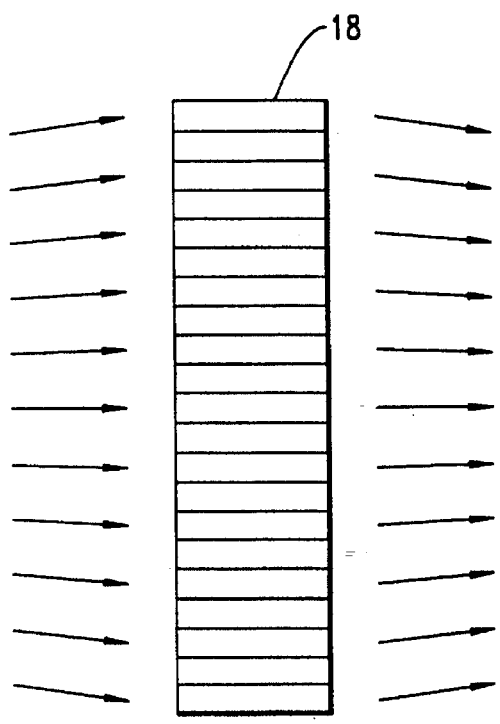
FIG. 6 is an explanatory view showing the light path of the optical unit used in the present invention.
Figure 7:
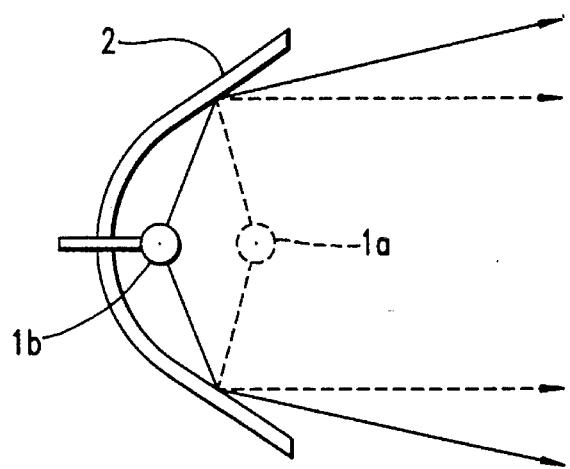
FIG. 7 is a sectional view showing the relative position of the light source and the reflector in the first embodiment of the present invention.

In view of the above, it should be appreciated that the optical unit 18 formed by a bundled plurality of the graded index lenses 50 converges and focuses light passing through the optical unit 18 when the light entering the optical unit 18 diverges, as show in FIG. 6. As a result, the light passed through the liquid crystal panel enters the projection lens system 6 with high efficiency. To provide slightly diverging light, the light source 1 may be located at a position 1b which is slightly shifted toward the inner side of the focal point 1a of the reflector 2 shown in FIG. 7. It is noted that the degree of shift of the light source 1 should be determined according to the degree of desired divergence of the light entering the optical unit.

Figure 8:
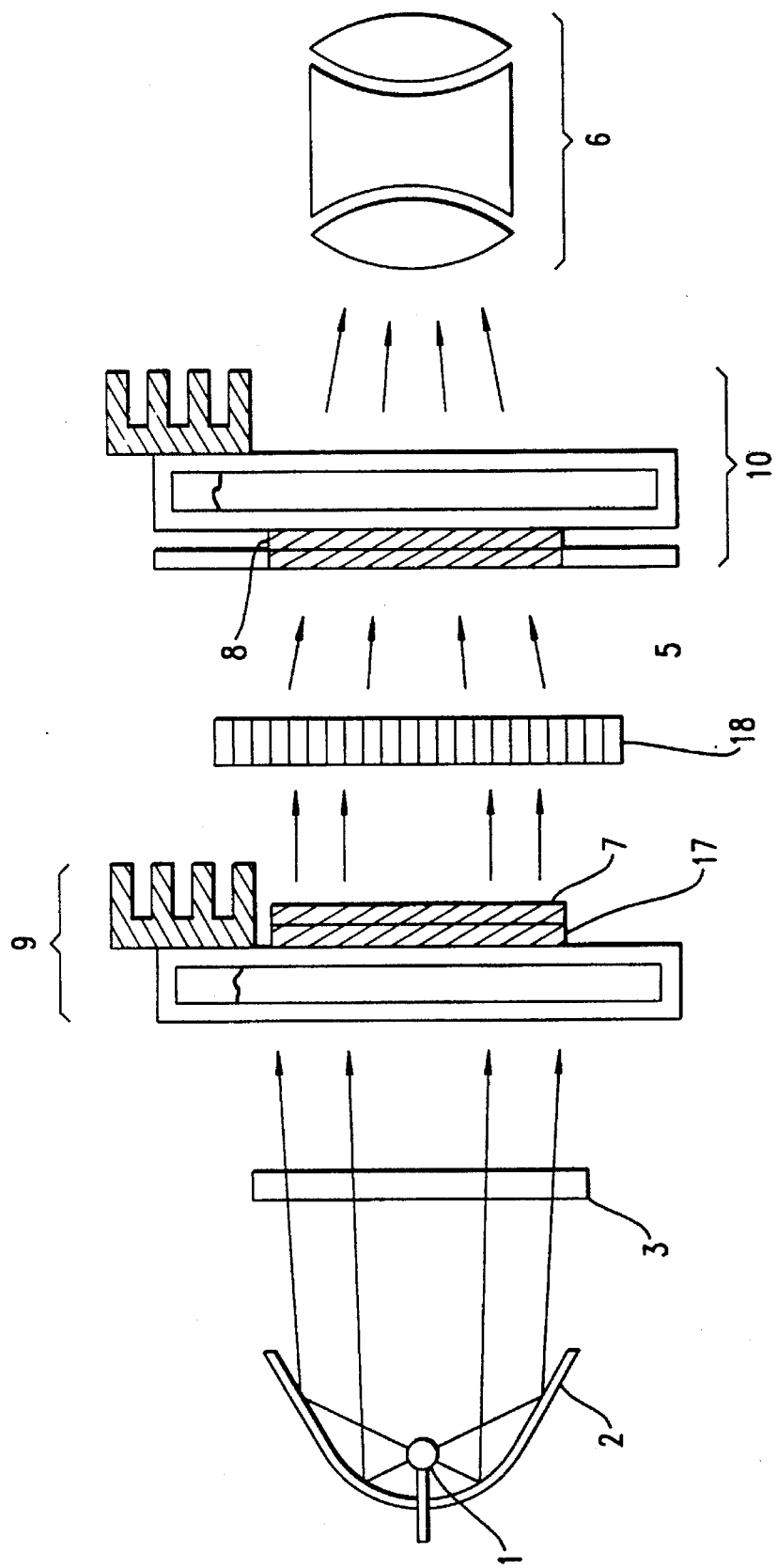
FIG. 8 is a sectional view showing the arrangement of optical components in accordance with a second embodiment of the present invention.

A second embodiment of the present invention is shown in FIG. 8. In this embodiment, the polarizing plate 7 disposed on the incident side of the liquid crystal panel 5 is attached to the color filter 17, being separated from the optical unit 18. In this embodiment, it is important that the optical unit 18 should not disturb the status of polarization of the light irradiated from the polarization plate 7 on the incident side.

Figure 9:
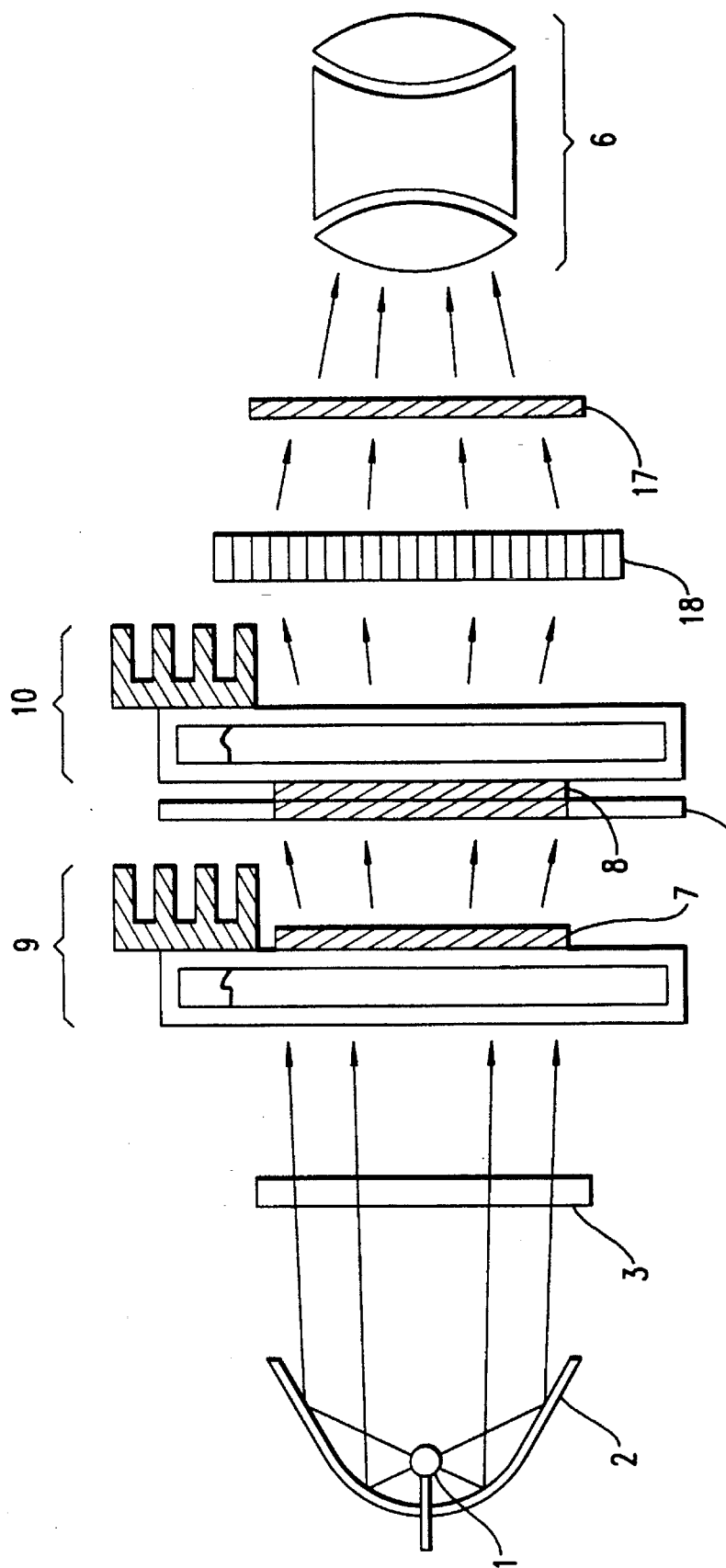
FIG. 9 is a sectional view showing the arrangement of optical components in accordance with a third embodiment of the present invention.

In a third embodiment, as shown in FIG. 9, the liquid crystal panel 5 and the polarizing plate 8 on emanating side of the liquid crystal panel 5 (with the liquid cooler 10) are positioned between the polarization plate 7 (with the liquid cooler 9) and the optical unit 18. The color filter 17 is positioned between the optical unit 18 and the projection lens 6. In this embodiment, the image of the liquid crystal panel 5 is focused on the color filter 17 by the optical unit 18.

Figure 10:
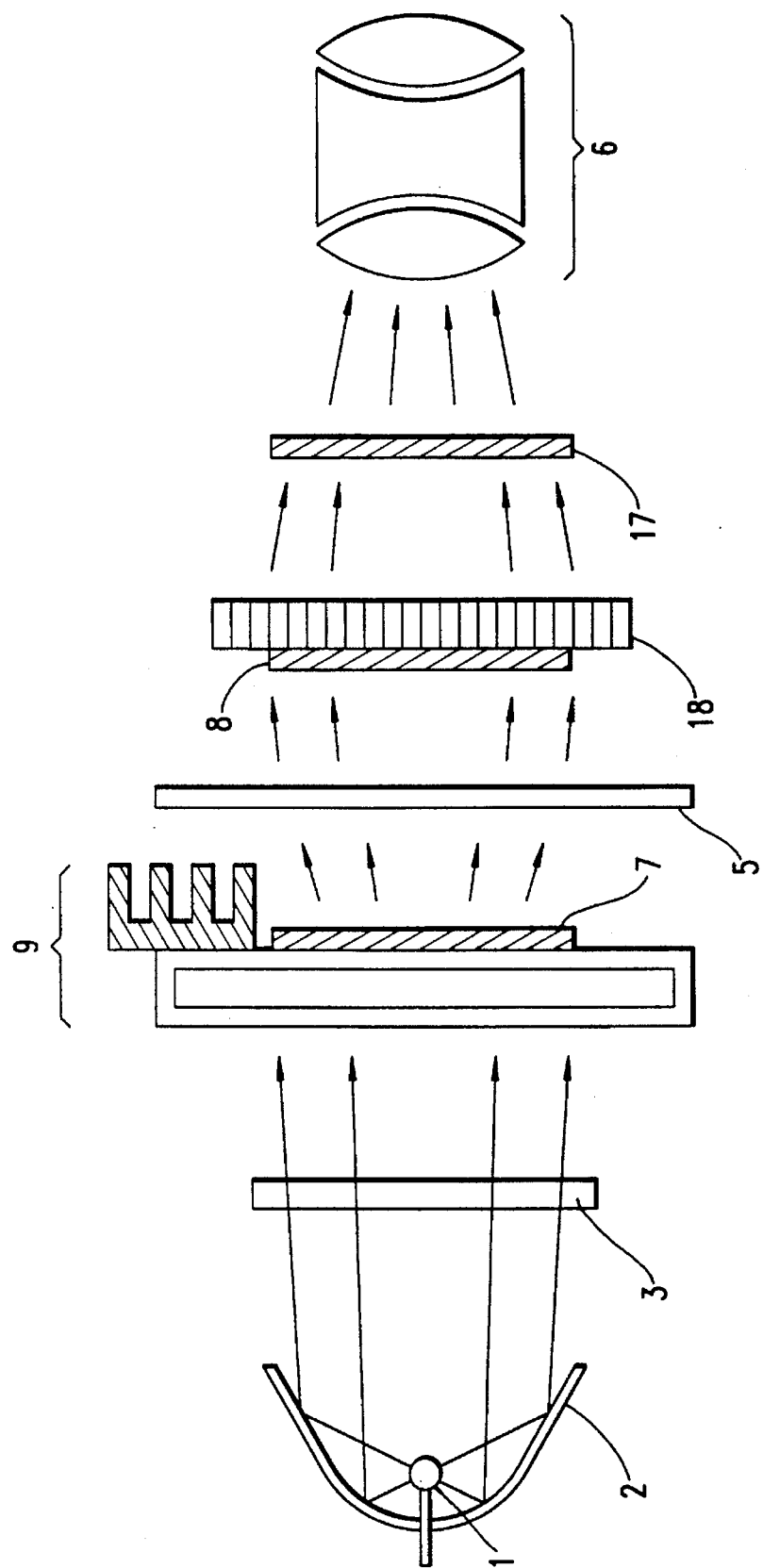
FIG. 10 is a sectional view showing the arrangement of optical components in accordance with a forth embodiment of the present invention.

In a forth embodiment of the present invention, as shown in FIG. 10, the components are arranged in the following order from the light source 1 to the projection lens 6: the infrared and ultraviolet cutoff filter 3, the polarizing plate 7 on the incident side of the liquid crystal panel 5, the liquid crystal panel 5 and the liquid cooler 9, the polarizing plate 8 on emanating side of the liquid crystal panel 5, the optical unit 18, and the color filter 17.

Figure 11:
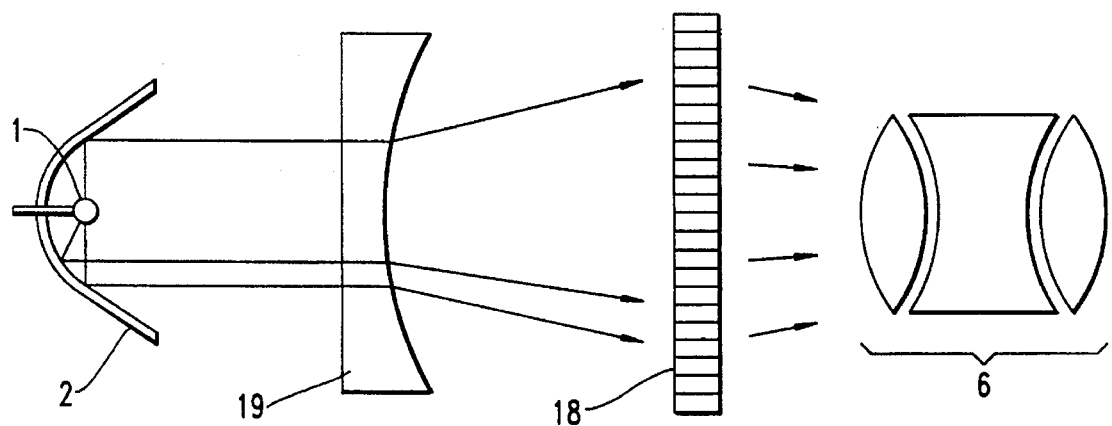
FIG. 11 is a sectional view showing a second embodiment of the light source.
Figure 12:
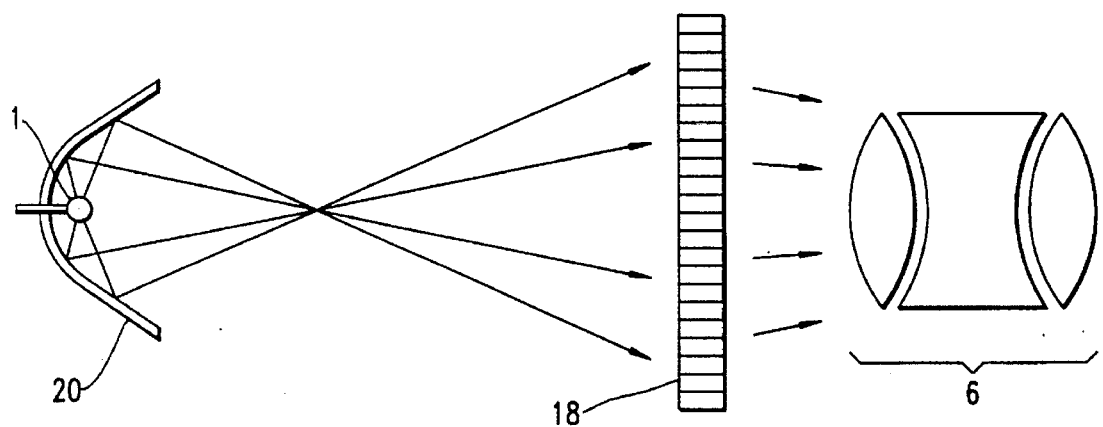
FIG. 12 is a sectional view showing a third embodiment of the light source.
Figure 13:
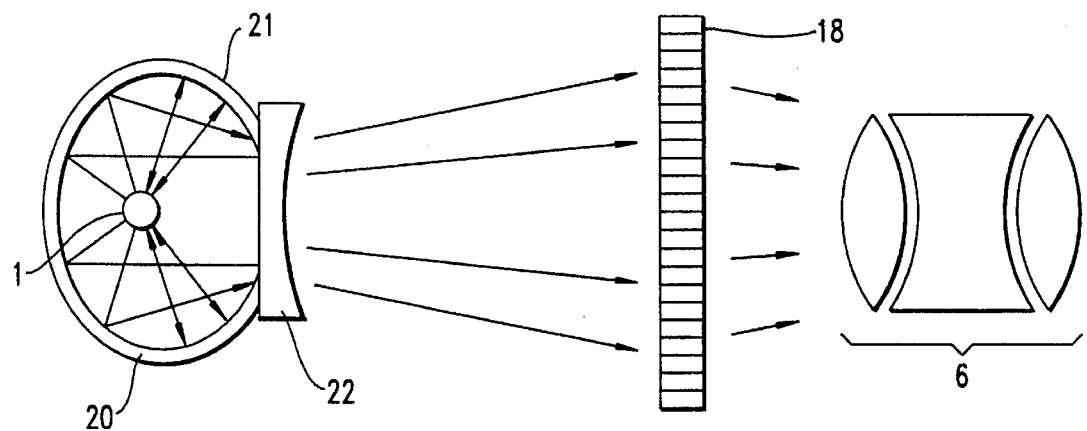
FIG. 13 is a sectional view showing a forth embodiment of the light source.
Figure 14:
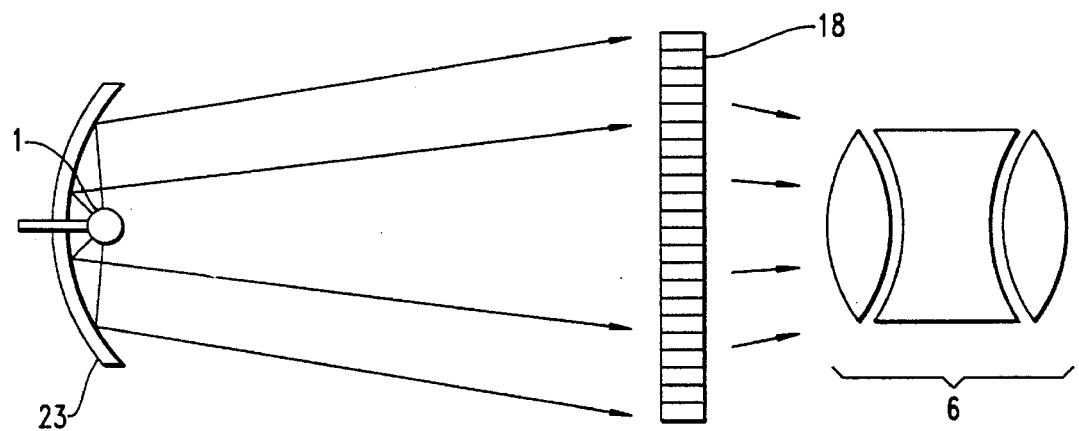
FIG. 14 is a sectional view showing a fifth embodiment of the light source.

FIGS. 11–14 show a variety of different arrangements for providing diverging light. FIG. 11 shows a concave lens 19 for diverging light. FIG. 12 shows a reflector 20 having an elliptical reflection face for first converging light to a focal point and then diverging. FIG. 13 shows a combination of a reflector 20 having an elliptical reflection face, a hemispherical reflector 21 having a focal point at which the light source 1 is located, and a concave lens 22. FIG. 14 shows a hyperboloic reflector 23.

Figure 15:
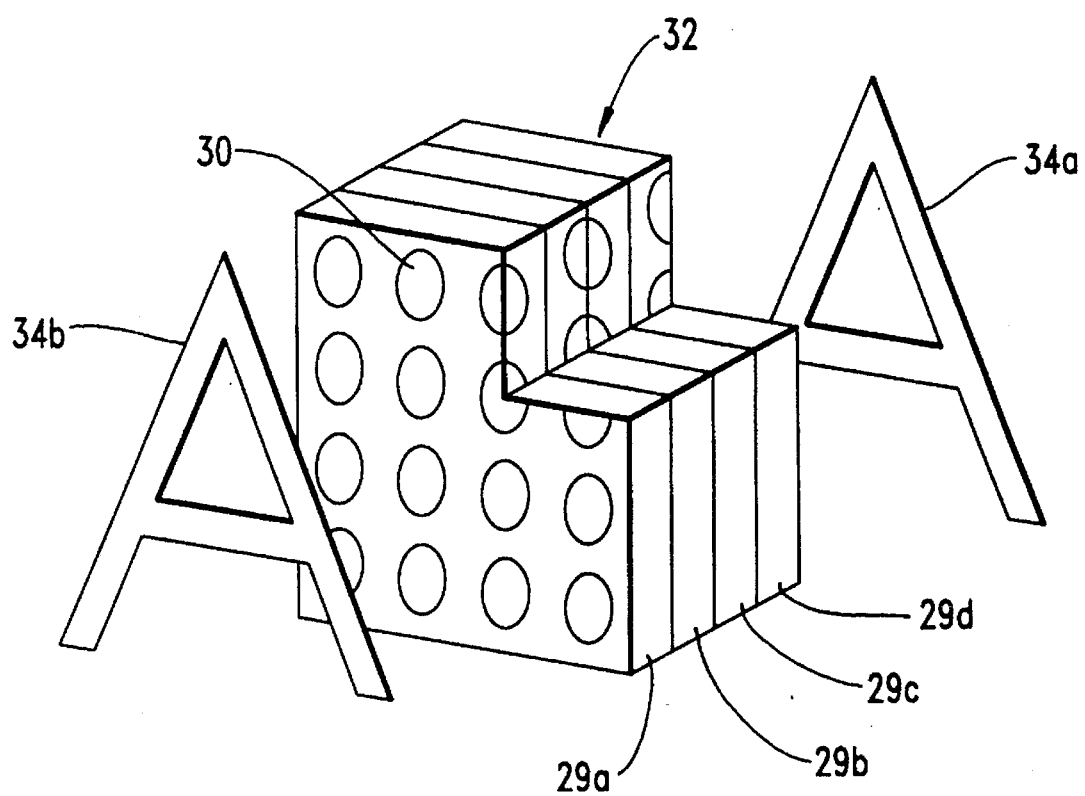
FIG. 15 is a perspective view showing alternative optical elements for the optical unit in the present invention.
Figure 16:
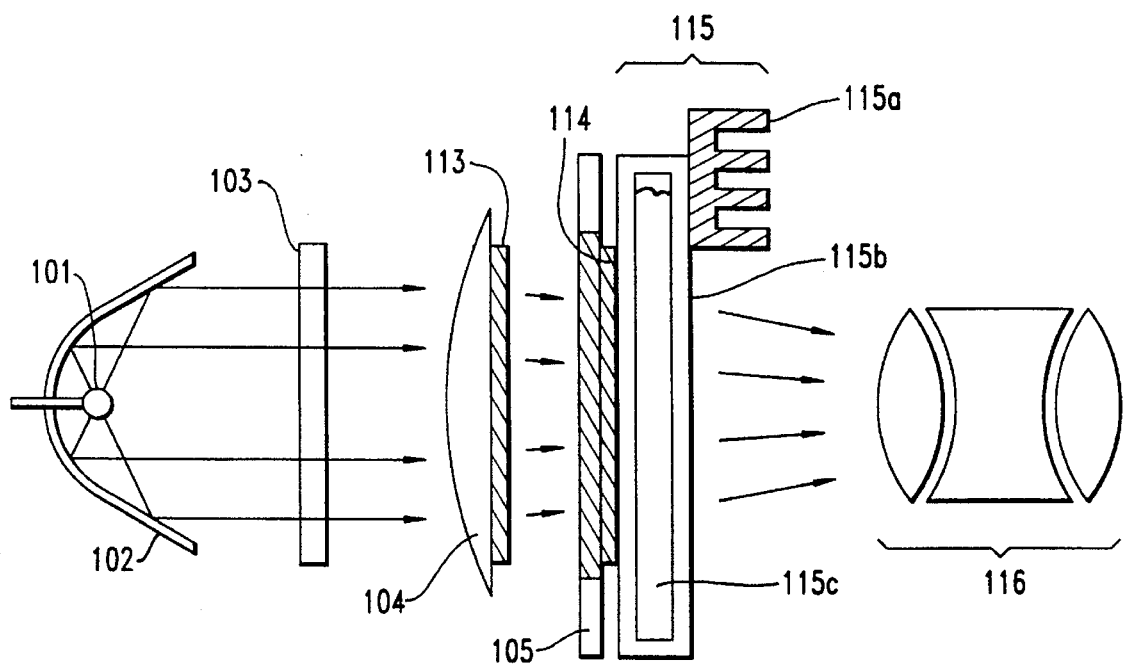
FIG. 16 is a sectional view of a conventional liquid crystal projector.
Figure 17:
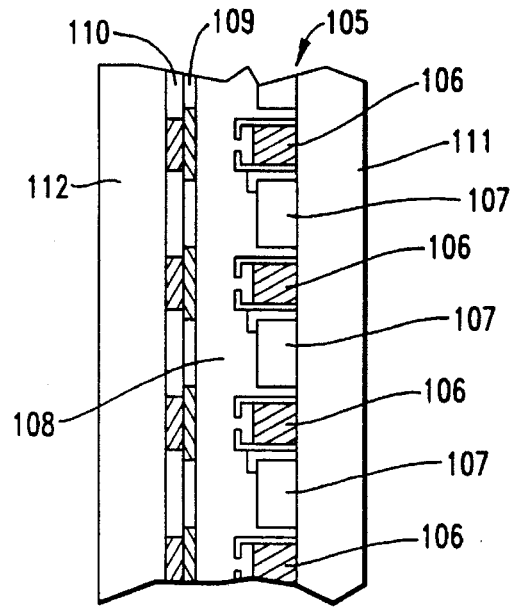
FIG. 17 is a sectional view showing the structure of a conventional liquid crystal panel.

In the above embodiments, the optical unit 18 is formed by a plurality of graded index lens. Alternatively, as shown in FIG. 15, the optical unit 18 may be formed by a plurality of micro-lens plates 29a–29d. Typically, a micro-lens plate contains numerous micro lenses 30 formed in an array. In accordance with one embodiment of the present invention, four micro-lens plates 29a–29d are combined to form an optical unit 32. The optical unit 32 is capable of forming an image 34a of an object 34b having the same orientation as the object 34b.

As described above, in one aspect of the present invention, a liquid crystal panel and a color filter are separated from each other. As a result, the increase in temperature at the color filter caused by absorbed light has less affect on the liquid crystal. As a consequence, the degradation of the liquid crystal in using the liquid crystal projector is substantially reduced.

Furthermore, a liquid crystal panel and a color filter are not combined as a unit and therefore it is not necessary to reject the liquid crystal panel because of a defective color filter resulting from a manufacturing process defect, and vice versa. As a result, the manufacturing cost is substantially reduced.

What is claimed is:

1. A liquid crystal projector comprising:
   a light source for radiating light, said light source having a reflector and a light emitting element;
   a color filter for adding color components to the light to form a pattern having the color components, said color filter having a filter portion transparent to the light from said light source and a black matrix for reflecting the light from said light source, said color filter being located adjacent said light source;.
   a projector lens for projecting an image;
   a liquid crystal panel separated from said color filter for forming the image having the color components, said liquid crystal panel being located adjacent said projection lens; and an optical unit located between and removed from said color filter and said liquid crystal panel for optically coupling the image of said liquid crystal panel and the pattern of said color filter in a same orientation, wherein said optical unit superposes the light passed through said color filter on the image formed by said liquid crystal panel.

2. A liquid crystal projector as defined in claim 1, wherein the black matrix reflects the light substantially toward said light source.

3. A liquid crystal projector comprising:

a light source for radiating light;

a color filter for adding color components to the light, said color filter being located adjacent said light source;

a liquid crystal panel separated from said color filter for forming an image having the color components;

a projector lens for projecting said image, said projector lens being located adjacent said liquid crystal panel; and an optical unit, having an array of lenses, for optically coupling said liquid crystal panel and said color filter, said optical unit being located between said color filter and said liquid crystal panel and superposing the light passed through said color filter on the image formed by said liquid crystal panel.

4. A liquid crystal projector as defined in claim 3, wherein said array of lenses comprises an array of graded index lenses, and said light source emits diverging light.

5. A liquid crystal projector comprising:

a light source for radiating light;

a color filter for adding color components to the light;

a liquid crystal panel separated from said color filter for forming an image having the color components, said liquid crystal panel being located adjacent said light source;

a projector lens for projecting said image, said projector lens being located adjacent said color filter; and an optical unit, having an array of lenses, for optically coupling said liquid crystal panel and said color filter, said optical unit being located between said color filter and said liquid crystal panel and imaging the image of said liquid crystal panel on said color filter.

6. A liquid crystal projector as defined in claim 5, wherein said array of lenses comprises an array of graded index lenses, and said light source emits diverging light.

7. A liquid crystal projector comprising:

a light source for radiating light;

a color filter located adjacent said light source and having a filter portion for adding color components to the light and a black matrix for substantially reflecting the light;

a liquid crystal panel for forming an image with the light having the color components, said liquid crystal panel and said color filter being physically separated from each other to substantially eliminate thermal conduction between said liquid crystal panel and said color filter; and a projector lens for projecting the image, the liquid crystal panel being located between the light source and the projector lens.

8. A liquid crystal panel assembly for a liquid crystal projector, the liquid crystal projector having a light source and a projector lens, the liquid crystal panel assembly comprising:

a color filter for forming a pattern having color components;

a liquid crystal panel spaced a distance from said color filter for forming an image; and an optical unit located between and spaced from said color filter and said liquid crystal panel for optically coupling said pattern and said image in a same orientation, wherein the color filter includes a filter portion transparent to light from the light source and a black matrix for reflecting light from the light source.

9. A liquid crystal panel assembly for a liquid crystal projector, the liquid crystal projector having a light source and a projector lens, the liquid crystal panel assembly comprising:

a color filter for forming a pattern having color components;

a liquid crystal panel spaced a distance from said color filter for forming an image; and an optical unit located between and spaced from said color filter and said liquid crystal panel for optically coupling said pattern and said image in a same orientation, wherein said color filter is located adjacent said light source and said liquid crystal panel is located adjacent said projector lens, and wherein said optical unit has an array of lenses for superposing the pattern of said color filter on the image formed by said liquid crystal panel.

* * * * *